United States Patent
Su et al.

(10) Patent No.: US 11,449,966 B2
(45) Date of Patent: Sep. 20, 2022

(54) REAL-TIME VIDEO ULTRA RESOLUTION

(71) Applicant: Huawei Technologies Co., Ltd., Shenzhen (CN)

(72) Inventors: Wei Su, Redmond, WA (US); Xin Liu, Kirkland, WA (US); Hongyu Sun, Sammamish, WA (US); Xiaoxing Zhu, Bellevue, WA (US); Fan Zhang, Sammamish, WA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 16/946,379

(22) Filed: Jun. 18, 2020

(65) Prior Publication Data

US 2020/0402205 A1  Dec. 24, 2020

Related U.S. Application Data

(63) Continuation of application No. PCT/US2019/037727, filed on Jun. 18, 2019.

(51) Int. Cl.
*G06T 3/40* (2006.01)
*G06N 3/08* (2006.01)
(Continued)

(52) U.S. Cl.
CPC .......... *G06T 3/4053* (2013.01); *G06N 3/084* (2013.01); *G06N 5/046* (2013.01); *G06T 3/4046* (2013.01);
(Continued)

(58) Field of Classification Search
None
See application file for complete search history.

(56) References Cited

U.S. PATENT DOCUMENTS

| | | | | |
|---|---|---|---|---|
| 2008/0107311 | A1* | 5/2008 | Huang | ............... G06K 9/00288 382/118 |
| 2012/0086850 | A1* | 4/2012 | Irani | ........................ G06T 3/40 348/441 |

(Continued)

OTHER PUBLICATIONS

Dong, Chao, et al. "Image super-resolution using deep convolutional networks." IEEE transactions on pattern analysis and machine intelligence 38.2 (2015): 295-307. (Year: 2015).*

(Continued)

*Primary Examiner* — Andrae S Allison
(74) *Attorney, Agent, or Firm* — Schwegman Lundberg & Woessner, P.A.

(57) ABSTRACT

A computer-implemented method for increasing the image resolution of a digital image is provided. The method includes performing bicubic upsampling of the digital image to generate a base high-resolution (HR) image. The digital image is converted from a red-green-blue (RGB) color space to a Luma (Y), Chroma Blue Difference (Cb), and Chroma Red Difference (Cr) (YCbCr) color space to generate a low-resolution (LR) residual image. A plurality of convolutional layers of a neural network model is applied to the LR residual image to convert it to a plurality of HR residual sub-images corresponding to the digital image. An HR image corresponding to the digital image is generated using the base HR image and the plurality of HR residual sub-images.

20 Claims, 9 Drawing Sheets

(51) Int. Cl.
- *G06N 5/04* (2006.01)
- *G06T 5/00* (2006.01)
- *G06T 5/20* (2006.01)
- *G06T 5/50* (2006.01)

(52) U.S. Cl.
CPC .............. *G06T 5/002* (2013.01); *G06T 5/004* (2013.01); *G06T 5/007* (2013.01); *G06T 5/20* (2013.01); *G06T 5/50* (2013.01); *G06T 2207/10024* (2013.01); *G06T 2207/20081* (2013.01); *G06T 2207/20084* (2013.01); *G06T 2207/20224* (2013.01)

(56) References Cited

U.S. PATENT DOCUMENTS

| | | | |
|---|---|---|---|
| 2015/0269708 A1* | 9/2015 | Porikli | G06T 5/003 382/160 |
| 2018/0122047 A1* | 5/2018 | Wang | G06T 3/4046 |
| 2018/0240219 A1* | 8/2018 | Mentl | G06T 11/008 |
| 2018/0270488 A1* | 9/2018 | Jeong | H04N 19/124 |

OTHER PUBLICATIONS

Zhang, Yulun, et al. "Image super-resolution using very deep residual channel attention networks." Proceedings of the European conference on computer vision (ECCV). 2018. (Year: 2018).*

Lim, Bee, et al. "Enhanced deep residual networks for single image super-resolution." Proceedings of the IEEE conference on computer vision and pattern recognition workshops. 2017. (Year: 2017).*

Yang, Wenhan, et al. "Video super-resolution based on spatial-temporal recurrent residual networks." Computer Vision and Image Understanding 168 (2018): 79-92. (Year: 2018).*

Huang, Gao, et al. "Densely connected convolutional networks." Proceedings of the IEEE conference on computer vision and pattern recognition. 2017. (Year: 2017).*

"International Application Serial No. PCT/US2019/037727, International Search Report dated Sep. 26, 2019", 4 pgs.

"International Application Serial No. PCT/US2019/037727, Written Opinion dated Sep. 26, 2019", 6 pgs.

Al-Falluji, Ruaa Adeeb Abdulmunem, et al., "Single Image Super Resolution Algorithms: A Survey and Evaluation", International Journal of Advanced Research in Computer Engineering & Technology (IJARCET). 6. 2278-1323, (2017), 7 pgs.

Caballero, Jose, et al., "Real-Time Video Super-Resolution with Spatio-Temporal Networks and Motion Compensation", CVPR; 4778-4787, (2017), 10 pgs.

Chen, Chao, et al., "Single Image Super-Resolution Using Deep CNN with Dense Skip Connections and Inception-ResNet", 2018 9th International Conference on Information Technology in Medicine and Education (ITME), IEEE, (Oct. 19, 2018), 999-1003.

Dong, Chao, et al., "Compression Artifact Reduction by a Deep Convolutional Network", ICCV, (2015), 9 pgs.

Dong, Chao, et al., "Image Super-Resolution Using Deep Convolutional Networks", IEEE Transactions on Pattern Analysis and Machine Intelligence (TPAMI), Preprint, (2015), 14 pgs.

Esmaeilzehi, Alireza, et al., "Compnet: A New Scheme for Single Image Super Resolution Based on Deep Convolutional Neural Network", IEEE Access, vol. 6, (Oct. 8, 2018), 59963-59974.

He, Kaiming, et al., "Deep Residual Learning for Image Recognition", 2016 IEEE Conference on Computer Vision and Pattern Recognition, (2016), 770-778.

Jain, Viren, et al., "Natural Image Denoising with Convolutional Networks", NIPS, (2018), 8 pgs.

Kappeler, Armin, et al., "Video Super-Resolution With Convolutional Neural Networks", IEEE Transactions on Computational Imaging, vol. 2, No. 2; pp. 109-122, (2016), 14 pgs.

Kim, Jiwon, et al., "Accurate Image Super-Resolution Using Very Deep Convolutional Networks", CVPR, (2016), 1646-1654.

Ledig, Christian, et al., "Photo-Realistic Single Image Super-Resolution Using a Generative Adversarial Network", CVPR, 4681-4690, (2017), 10 pgs.

Nasrollahi, T., et al., "Super-resolution: a comprehensive survey", Machine Vision and Applications, vol. 25, No. 6, pp. 1423-1468, (2014), 46 pgs.

Shi, Wenzhe, et al., "Real-Time Single Image and Video Super-Resolution Using an Efficient Sub-Pixel Convolutional Neural Network", CVPR, 1874-1883, (2016), 10 pgs.

Yang, Jianchao, et al., "Image super-resolution via sparse representation", IEEE Transactions on Image Processing, 19(11), 2861-2873, (2010), 13 pgs.

Yang, Wenming, et al., "Deep Learning for Single Image Super-Resolution: A Brief Review", CoRR, (2018), 17 pgs.

Zhang, Yulun, et al., "Image Super-Resolution Using Very Deep Residual Channel Attention Networks", ECCV, (2018), 16 pgs.

* cited by examiner

REAL-TIME VIDEO ULTRA RESOLUTION

CROSS-REFERENCE TO RELATED APPLICATIONS

This application is a continuation application of and claims priority to and benefit of International Application No. PCT/US2019/037727, filed on Jun. 18, 2019, entitled "REAL-TIME VIDEO ULTRA RESOLUTION," which application is hereby incorporated by reference in its entirety.

TECHNICAL FIELD

The present disclosure is related to video data processing on computing devices.

BACKGROUND

With the rapid development of electronics technology, 2k and 4k high-definition (HD) displays have become standard for home theater systems, tablet computers, and mobile devices. Videos played on mobile devices usually have lower resolutions, because of the limitations associated with the video capturing device, storage space, network bandwidth, and/or data flow. It is therefore important to boost the effective resolution and visual effects of videos before individual frames are displayed on modern devices, to take full advantage of the new generations of HD displays.

Existing image resolution enhancement techniques operate primarily on good quality images that do not have noise and artifacts. When noise and blocking artifacts are present in the input video (e.g., videos viewed on mobile devices), the use of the existing techniques often results in further deterioration of the image quality. Additionally, due to computational complexity, current image resolution enhancement techniques do not improve the peak signal-to-noise ratio (PSNR) and structural similarity (SSIM) in comparison to conventional interpolation techniques, and, therefore, have limited use in image processing on mobile devices with HD displays.

SUMMARY

Various examples are now described to introduce a selection of concepts in a simplified form, which are further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for increasing image resolution of a digital image. The method includes performing bicubic upsampling of the digital image to generate a base high-resolution (HR) image. The digital image is converted from a red-green-blue (RGB) color space to a Luma (Y), Chroma Blue Difference (Cb), and Chroma Red Difference (Cr) (YCbCr) color space to generate a low-resolution (LR) residual image. The LR residual image is converted, using the plurality of convolutional layers of the neural network model, into a plurality of HR residual sub-images corresponding to the digital image. An HR image corresponding to the digital image is generated using the base HR image and the plurality of HR residual sub-images.

In a first implementation form of the method according to the first aspect as such, the plurality of HR residual sub-images is pixel shifted to generate an HR residual image. The generating of the HR image corresponding to the digital image includes combining the HR residual image and the base HR image.

In a second implementation form of the method according to the first aspect as such or any implementation form of the first aspect, the neural network model includes an input layer, and the plurality of convolutional layers comprises four convolutional layers.

In a third implementation form of the method according to the first aspect as such or any implementation form of the first aspect, the input layer is configured to receive the digital image, and an output layer of the four convolutional layers is configured to output the plurality of HR residual sub-images.

In a fourth implementation form of the method according to the first aspect as such or any implementation form of the first aspect, where a first layer of the plurality of convolutional layers is configured with 3×3 pixel kernels and 8 channels, a second layer of the plurality of convolutional layers is configured with 3×3 pixel kernels and 6 channels, a third layer of the plurality of convolutional layers is configured with 3×3 pixel kernels and 4 channels, and a fourth layer of the plurality of convolutional layers is configured with 4 channels. As used herein, the term "pixel kernel" indicates a matrix of pixel values.

In a fifth implementation form of the method according to the first aspect as such or any implementation form of the first aspect, the neural network model is trained with a plurality of training image sets. Each training image set of the plurality of training image sets includes an LR image corresponding to a training image and a plurality of HR residual sub-images corresponding to the training image and configured as a target output of the neural network model. The LR image has degraded image quality and is configured as an input to the neural network model.

In a sixth implementation form of the method according to the first aspect as such or any implementation form of the first aspect, training the neural network model includes filtering the training image using a low-pass filter to generate a filtered image, downsampling the filtered image to generate a downsampled LR image, and degrading image quality of the downsampled LR image by adding noise and artifacts, to generate the LR image corresponding to the training image.

In a seventh implementation form of the method according to the first aspect as such or any implementation form of the first aspect, training the neural network model includes applying an unbalanced unsharp mask to the training image to generate a contrast-enhanced image, and subtracting an upsampled version of the downsampled LR image from the contrast-enhanced image to generate an HR residual image corresponding to the training image.

In an eighth implementation form of the method according to the first aspect as such or any implementation form of the first aspect, training the neural network model further includes splitting the HR residual image corresponding to the training image to generate the plurality of HR residual sub-images corresponding to the training image.

According to a second aspect of the present disclosure, there is provided a system for increasing image resolution of a digital image. The system includes memory storing instructions and one or more processors in communication with the memory. The one or more processors execute the instructions to perform bicubic upsampling of a digital image to generate a base high-resolution (HR) image. The digital image is converted from a red-green-blue (RGB)

color space to a Luma (Y), Chroma Blue Difference (Cb), and Chroma Red Difference (Cr) (YCbCr) color space to generate a low-resolution (LR) residual image. A plurality of convolutional layers of a neural network model is applied to the LR residual image to convert the LR residual image into a plurality of HR residual sub-images corresponding to the digital image. An HR image corresponding to the digital image is generated using the base HR image and the plurality of HR residual sub-images.

In a first implementation form of the system according to the second aspect as such, the one or more processors are further configured to shift pixels of the plurality of HR residual sub-images to generate an HR residual image and combine the HR residual image and the base HR image to generate the HR image corresponding to the digital image.

In a second implementation form of the system according to the second aspect as such or any implementation form of the second aspect, the neural network model includes an input layer and the plurality of convolutional layers comprises four convolutional layers. The input layer is configured to receive the digital image. An output layer of the four convolutional layers is configured to output the plurality of HR residual sub-images.

In a third implementation form of the system according to the second aspect as such or any implementation form of the second aspect, where a first layer of the plurality of convolutional layers is configured with 3×3 pixel kernels and 8 channels, a second layer of the plurality of convolutional layers is configured with 3×3 pixel kernels and 6 channels, a third layer of the plurality of convolutional layers is configured with 3×3 pixel kernels and 4 channels, and a fourth layer of the plurality of convolutional layers is configured with 4 channels.

In a fourth implementation form of the system according to the second aspect as such or any implementation form of the second aspect, the one or more processors are further configured to train the neural network model with a plurality of training image sets. Each training image set of the plurality of training image sets includes an LR image corresponding to a training image, and a plurality of HR residual sub-images corresponding to the training image and configured as a target output of the neural network model. The LR image has degraded image quality and is configured as an input to the neural network model.

In a fifth implementation form of the system according to the second aspect as such or any implementation form of the second aspect, the one or more processors are further configured to filter the training image using a low-pass filter to generate a filtered image, downsample the filtered image to generate a downsampled LR image, and degrade the image quality of the downsampled LR image by adding noise and artifacts, to generate the LR image corresponding to the training image.

In a sixth implementation form of the system according to the second aspect as such or any implementation form of the second aspect, to train the neural network model the one or more processors are further configured to apply an unbalanced unsharp mask to the training image to generate a contrast-enhanced image and subtract an upsampled version of the downsampled LR image from the contrast-enhanced image to generate an HR residual image corresponding to the training image.

In a seventh implementation form of the system according to the second aspect as such or any implementation form of the second aspect, to train the neural network model, the one or more processors are further configured to split the HR residual image corresponding to the training image to generate the plurality of HR residual sub-images corresponding to the training image.

According to a third aspect of the present disclosure, there is provided a non-transitory computer-readable medium storing instructions for increasing image resolution of a digital image. When executed by one or more processors, the instructions cause the one or more processors to perform operations including performing bicubic upsampling of the digital image to generate a base high-resolution (HR) image. The digital image is converted from a red-green-blue (RGB) color space to a Luma (Y), Chroma Blue Difference (Cb), and Chroma Red Difference (Cr) (YCbCr) color space to generate a low-resolution (LR) residual image. A plurality of convolutional layers of a neural network model is applied to the LR residual image, to convert the LR residual image into a plurality of HR residual sub-images corresponding to the digital image. An HR image corresponding to the digital image is generated, using the base HR image and the plurality of HR residual sub-images.

In a first implementation form of the non-transitory computer-readable medium according to the third aspect as such, the operations further include training the neural network model with a plurality of training image sets. Each training image set of the plurality of training image sets includes an LR image corresponding to a training image and a plurality of HR residual sub-images corresponding to the training image and configured as a target output of the neural network model. The LR image having a degraded image quality is configured as an input to the neural network model.

In a second implementation form of the non-transitory computer-readable medium according to the third aspect as such or any other implementation form of the third aspect, the operations further include filtering the training image using a low-pass filter to generate a filtered image, downsampling the filtered image to generate a downsampled LR image, and degrading image quality of the downsampled LR image by adding noise and artifacts, to generate the LR image corresponding to the training image.

In a third implementation form of the non-transitory computer-readable medium according to the third aspect as such or any implementation form of the third aspect, the operations further include applying an unbalanced unsharp mask to the training image to generate a contrast-enhanced image, subtracting an upsampled version of the downsampled LR image from the contrast-enhanced image to generate an HR residual image corresponding to the training image, and splitting the HR residual image corresponding to the training image to generate the plurality of HR residual sub-images corresponding to the training image.

According to a fourth aspect of the present disclosure, there is provided an image resolution adjustment system for increasing image resolution of a digital image. The system includes an upsampling means for performing bicubic upsampling of the digital image to generate a base high-resolution (HR) image. The system also includes a color space processing means for converting the digital image from a red-green-blue (RGB) color space to a Luma (Y), Chroma Blue Difference (Cb), and Chroma Red Difference (Cr) (YCbCr) color space to generate a low-resolution (LR) residual image. The system further includes a convolving means for converting the LR residual image into a plurality of HR residual sub-images corresponding to the digital image. The system also includes an adding means for generating an HR image corresponding to the digital image, using the base HR image and the plurality of HR residual sub-images.

Any of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
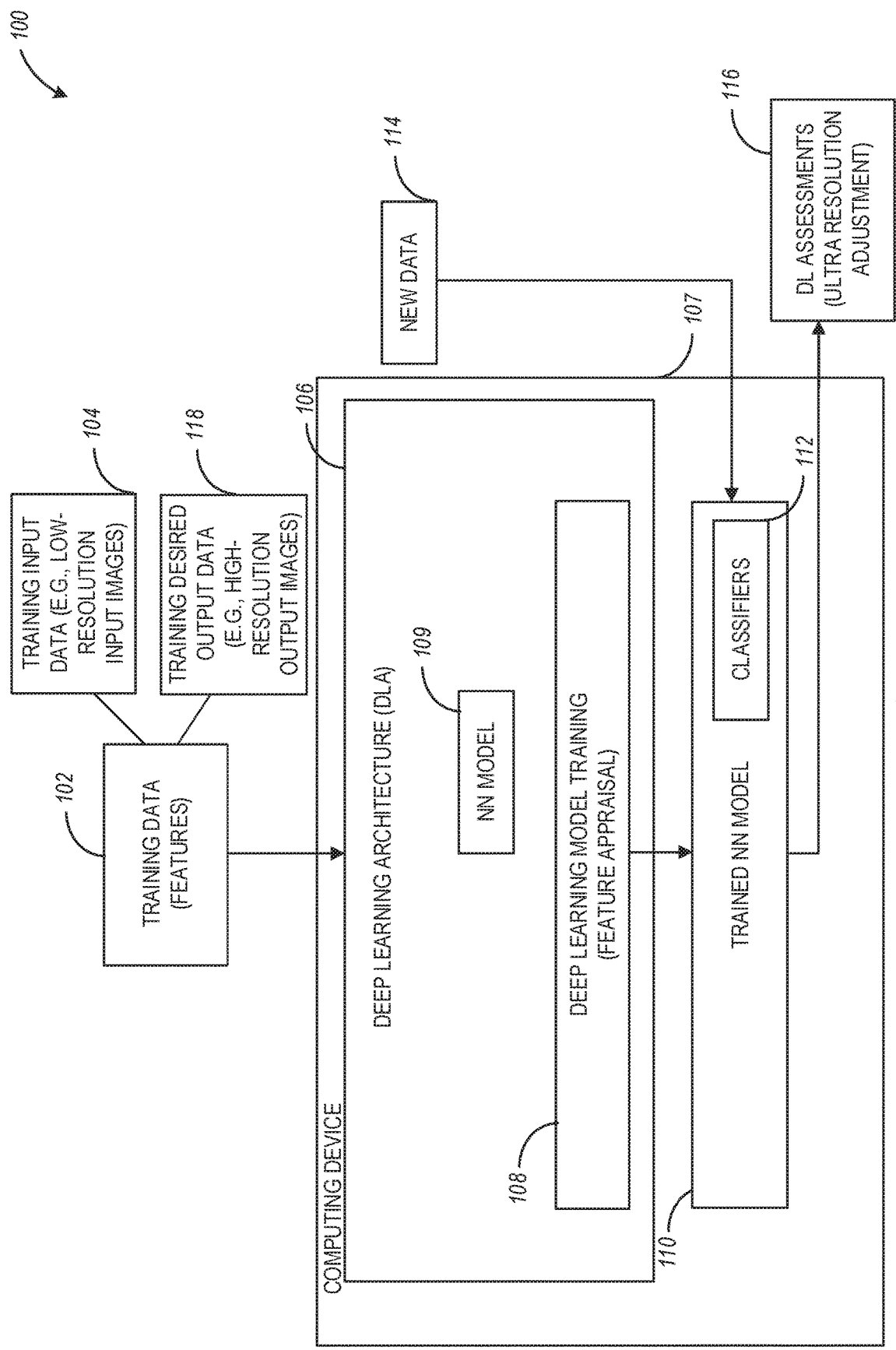
FIG. 1 is a block diagram illustrating a system for generating a trained NN model and using the trained NN model for generating deep learning (DL) assessments, according to example embodiments.

It should be understood at the outset that although an illustrative implementation of one or more embodiments is provided below, the disclosed systems and methods described with respect to FIGS. 1-9 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

The present disclosure is related to video data processing on computing devices. Some aspects relate to changing the image resolution of images using a neural network. Some aspects relate to real-time video ultra-resolution.

As used herein, the terms "low-resolution" (or LR) and "high-resolution" (or HR) in connection with an image are associated with the size of the image (in pixels). For example, if two images depict the same scene and the first image has bigger height and width (in pixels) in comparison to the height and width of the second image, then the first image is referred to as a high-resolution image and the second image is referred to as a low-resolution image. Alternatively, a high-resolution image has a high pixel density than an LR image, such as where the HR image has a large number of pixels per inch (or another distance measurement).

As used herein, the term "super-resolution" (or SR) refers to a resolution enhancement technique that increases the number of pixels (e.g., via upscaling) and improves the peak signal-to-noise ratio (PSNR) and structural similarity (SSIM) compared to conventional interpolation methods.

As used herein, the term "ultra-resolution" (or UR) includes the image resolution enhancement techniques of the SR (i.e., improving the resolution of video frames together with PSNR and SSIM), but also reduces the noise level, removes blocking artifacts commonly caused by video compression, and enhances local contrast (which functionalities are not present in SR).

As used herein, the terms "forward computation" and "backward computation" refer to computations performed at a worker machine in connection with the training of a neural network model (or another type of model). The computations performed during forward and backward computations in some embodiments modify weights based on results from prior iterations (e.g., based on gradients generated at a conclusion of a prior backward computation). A gradient is a measurement of how much output of a worker machine changes per change to the weights of the model that the worker machine is computing. A gradient measures a change in all weights concerning the change in error. The larger the gradient value, the faster a model can learn.

As used herein, the term "bicubic upsampling" refers to image upsampling using bicubic interpolation. Bicubic interpolation is a technique for interpolating data points on a two-dimensional grid. In connection with image processing, bicubic interpolation considers 16 pixels (4×4 pixel matrix), with the interpolation being performed via Lagrange polynomials, cubic splines, or cubic convolution algorithms.

Techniques disclosed herein can be used to improve image resolution on mobile devices in real-time. Techniques disclosed herein can be used to achieve ultra-resolution. Functionalities associated with UR are accomplished by an artificial neural network (ANN) using a neural network model that extracts and propagates residual image information through a limited number of convolutional layers. More specifically, a residual image is obtained by using the ANN (e.g., using an LR residual image corresponding to an LR input image), which is the difference between an HR image corresponding to the LR input image and a bicubic upsampled version of the LR input image Processing the LR residual image using the neural network model results in reduced data flow through the convolutional layers, allowing the model to work with a very small number of parameters. The terms "neural network" (or NN) and "artificial neural network" (or ANN) are synonymous and are used interchangeably herein. The terms "convolutional neural network" (or CNN) and "deep neural network" (or DNN) are synonymous and refer to a type of neural network that includes multiple convolutional layers. As used herein, the terms "neural network" and "neural network model" are interchangeable. In this regard, a neural network can be defined as ANN, CNN, DNN, or convolutional layers.

Techniques disclosed herein can also be used to train the neural network model with input-output image sets created from a training image set. An example image in the training image set is downsampled and degraded on the input side with simulated noises and blocking artifacts to enable the model to perform SR processing, noise reduction (NR), and artifact removal (AR) to achieve optimal UR processing within mobile devices. The local contrast of the HR image on the output side can be enhanced to boost the fine details discovered during SR processing. In this regard, the neural network model is trained to efficiently perform UR processing with significant visual perception improvements that can be achieved in real-time with acceptable energy consumption by the UR processing.

Prior art techniques perform SR processing using image de-convolution algorithms or example-based sparse coding algorithms. For example, some prior art techniques use a three-layer convolutional model to simulate the procedures of sparse coding for patch extraction, non-linear mapping, and reconstruction, respectively. Such techniques, however, are inefficient, because the input LR image needs to be upsampled to the high resolution before it is fed into the convolutional layers. Consequently, all convolution operations are conducted in the HR space, which contains a significant amount of redundant calculations. Other prior art techniques use an LR input image and perform convolutions in LR space, until the last step when sub-pixels are combined into an HR image with convolution operations. Such techniques, however, are also slow when working on mobile devices.

A new trend in single image SR processing is using generative adversarial networks (GANs) to generate fine details that are missing in an image. However, the GANs depend on big network capacity to produce good results and thus are not suitable to be deployed on mobile devices. Other prior art SR algorithms designed for videos include optical flow evaluations between successive frames to compensate for motions across frames. Because optical flow evaluations are computation-intensive tasks that are not easier than processing tasks associated with using GANs, those video SR algorithms are also slow to work on mobile devices.

Figure 5:
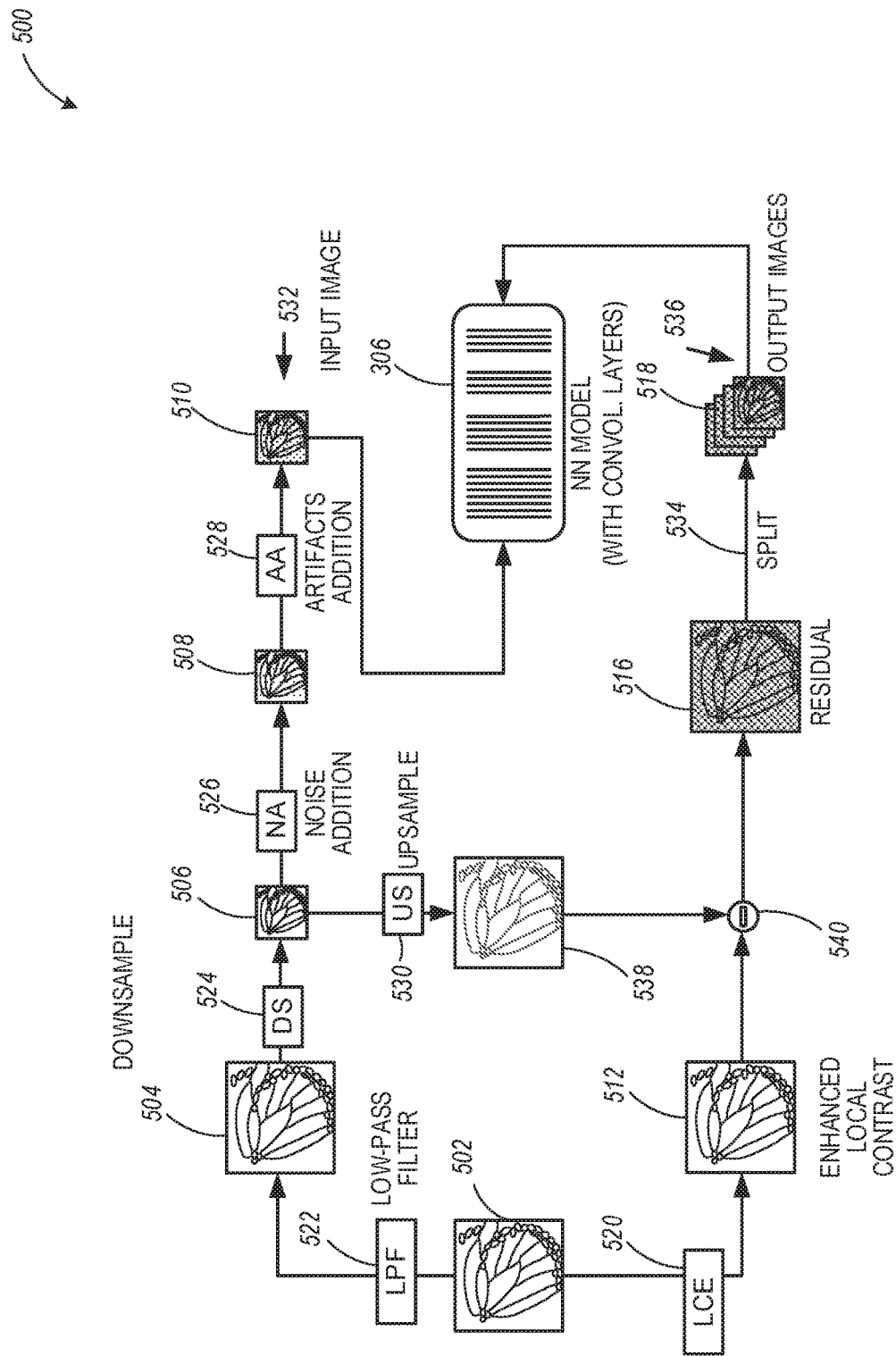
FIG. 5 is a diagram illustrating the generation of training image sets, which can be used for training of the DLA of FIG. 1, according to example embodiments.

The following are distinctive features of the presently-disclosed techniques for improving image resolution and performing real-time UR processing on mobile devices (which features are not present in the prior art image processing techniques), including: (1) using ultra-resolution processing for mobile device applications, which enhances the overall visual perception besides the sole task of super resolution; (2) using a neural network model (which can be implemented as a concise neural network model with a reduced number of convolutional layers and parameters, such as four convolutional layers as illustrated in FIG. 5) that combines the functions of super resolution, noise reduction, blocking artifact removal, and local contrast enhancement, and can be deployed on mobile devices with real-time performance (a residual image, and not an entire SR image, is processed by the convolutional layers, saving significant processing resources and increasing UR processing speed); (3) using a fast pixel-shift operation at the output of the convolutional layers to replace a computationally intensive sub-pixel convolutions used in conventional techniques; and (4) using novel neural network model training techniques that degrade the image quality on the input side and at the same time enhance the image quality on the output side, contributing to more efficient model training and generating of output video frames of superior visual perception.

Figure 2:
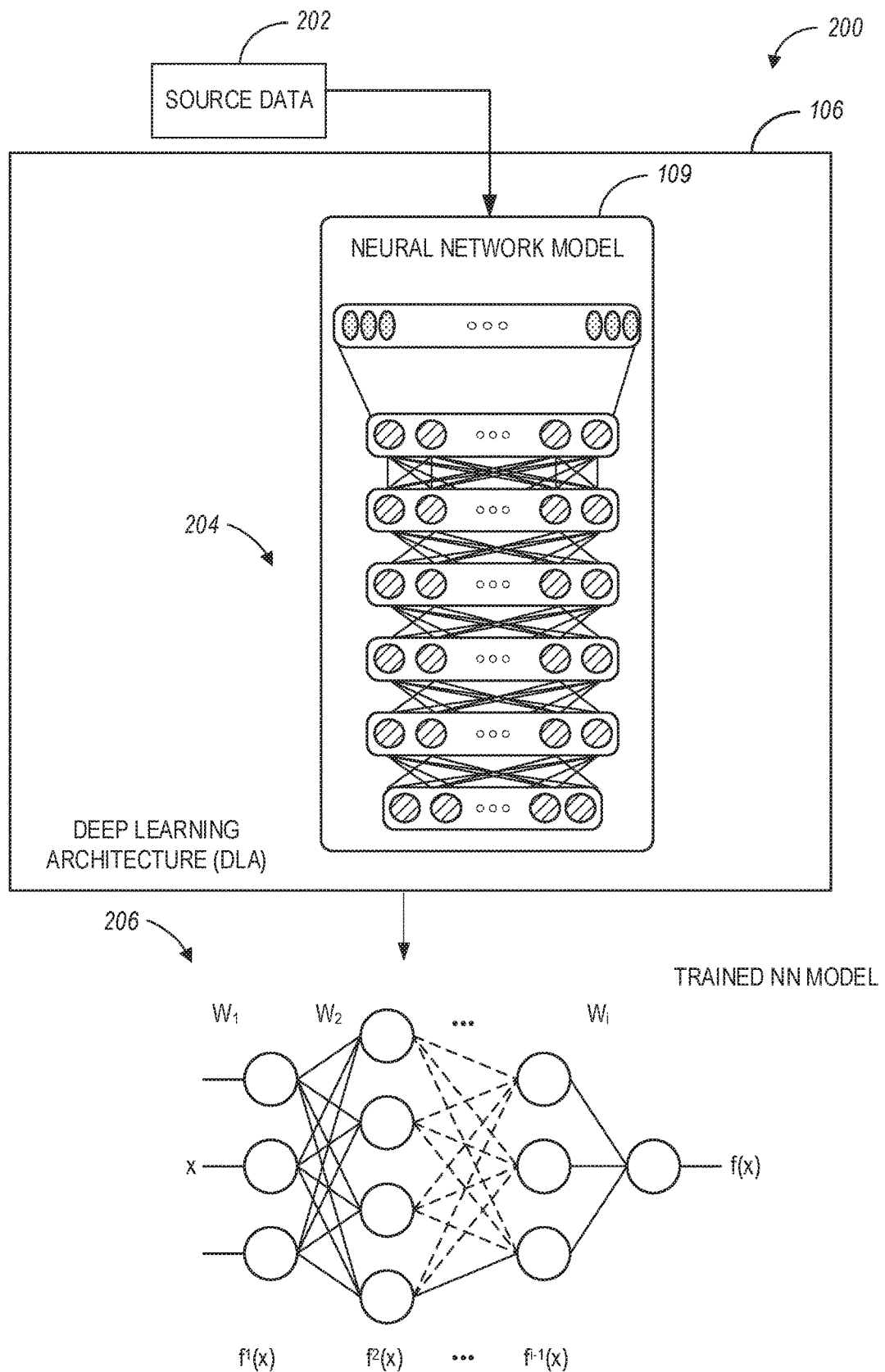
FIG. 2 is a diagram illustrating the generation of a trained NN model using a neural network model within a deep learning architecture (DLA) associated with the system of FIG. 1, according to example embodiments.

FIG. 1 is a block diagram illustrating a system for generating a trained NN model and using the trained NN model for generating DL assessments, according to example embodiments. Referring to FIG. 1, system 100 includes a computing device 107, which receives as input training data 102 or new data 114, and generates DL assessments 116 as output. The computing device 107 is configured to execute (e.g., as one or more software modules) a DLA 106 with a neural network model 109. The DLA 106 can perform DL model training 108 to train the NN model 109 and generate the trained NN model 110 (e.g., using the NN model 109, as illustrated in FIG. 2). The training data 102 includes training input data 104 and training desired output data 118, which data can be used during the DL model training 108.

The trained NN model 110 includes a classifier 112, which can be used to assess new data 114 and generate DL assessments 116 when the trained NN model 110 is applied to the new data 114. In an example aspect, the trained NN model 110 can be stored in a storage location (not illustrated in FIG. 1) of the computing device 107 (e.g., device memory).

Machine learning techniques train a NN model to accurately make predictions on data fed into the models. During a training (or learning) phase, the NN model is developed against a training dataset of inputs to optimize the model to correctly predict the target output for a given input. Generally, the training phase may be supervised, semi-supervised, or unsupervised; indicating a decreasing level to which the "correct" outputs are provided in correspondence to the training inputs. In a supervised learning phase, all of the target outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

A NN model may be run against a training dataset for several epochs, in which the training dataset is repeatedly fed into the model to refine its results (i.e., the entire dataset is processed during an epoch). During an iteration, the NN model is run against a mini-batch (or a portion) of the entire dataset. In a supervised learning phase, a model is developed to predict the target output for a given set of inputs (e.g., training data 102) and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the NN model is evaluated, and the values of its variables (e.g., weights, biases, or other parameters) are adjusted to attempt to better refine the NN model iteratively. As used herein, the term "weights" is used to refer to the parameters used by a machine learning model. The weights are values used by individual nodes and affect a signal or data as the data passes through the node during the processing of the data in the machine learning model. During a backward computation, a NN model can output gradients, which can be used for updating weights associated with a forward computation.

Each model refines the values of its nodes or layer of nodes over several epochs by varying the values of one or more variables, affecting the inputs to more closely map to the desired result. But, as the training dataset may be varied, and is preferably very large, perfect accuracy and precision may not be achievable. Several epochs that make up a learning phase, therefore, may be set as a given number of trials or a fixed time/computing budget or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, a trained model is generated based on the final weights that produce results close to the training desired output data. In example embodiments, models that are finalized are evaluated against testing criteria. In a first example, a testing dataset (that includes known target outputs for its inputs) is fed into the finalized models to determine the accuracy of the model in handling data that the model has not been trained on. In a second example, a false positive rate or false-negative rate may be used to evaluate the models after finalization. In a third example, a delineation between data clusters in each model is used to select a model that produces the clearest bounds for its clusters of data.

During the training of a DL model, a regression, which is structured as a set of statistical processes for estimating the relationships among variables, can include minimization of a cost function. The cost function may be implemented as a function to return a number representing how well the neural network performed in mapping training examples to correct output. In training, if the cost function value is not within a predetermined range, based on the known training images, backpropagation is used, where backpropagation is a common method of training artificial neural networks that are used with an optimization method such as stochastic gradient descent (SGD) method.

The use of backpropagation can include propagation and weight updates. When an input is presented to the neural network, it is propagated forward through the neural network, layer by layer, until it reaches the output layer. The output of the neural network is then compared to the desired target output, using the cost function, and an error value is calculated for each of the nodes in the output layer. The error values are propagated backward, starting from the output, until each node has an associated error value that roughly represents its contribution to the original output. Backpropagation can use these error values to calculate the gradient of the cost function concerning the weights in the neural network. The calculated gradient is fed to the selected optimization method to update the weights to attempt to minimize the cost function.

Referring again to FIG. 1, during an example training phase, the DLA 106 receives the training data 102, which includes training input data 104 and training desired output data 118 and initiates the training of the NN model 109. The training data 102 comprises a generated input image set (e.g., training input data 104 and training desired output data 118) used as a stand-in for actual data. The training input data 104 is run through convolutional layers of the NN model 109 and is changed by the NN model according to current node values in the convolutional layers of the NN model 109 (a more detailed view of the NN model 109 is illustrated in FIG. 2). The output of the NN model 109 is compared to the training desired output data 118, and the differences between the target output values and the current output values are fed back and are used to modify the current node values of the NN model 109. This is an iterative process, where the system converges on a solution over time as the node values eventually produce the target output values when the training data is run through the NN model 109. The final node values are then used to generate the trained NN model 110 (e.g., the trained NN model 110 can be the same as the NN model 109 but with weight values as determined at the end of the training phase).

In example embodiments, different machine learning tools may be used during the deep learning model training 108. For example, Logistic Regression, Naive-Bayes, Random Forest (RF), neural networks, matrix factorization, and Support Vector Machines (SVM) tools may be used during the deep learning model training 108 (e.g., for correlating the training data 102 and generating the trained NN model 110).

In example embodiments, during a new data processing operation, the trained NN model 110 utilizes features from the training data 102 for analyzing the new data 114 using the classifiers 112, resulting in the generation of the DL assessments 116 as an output. The features include individual measurable properties of a phenomenon being observed and used for training the machine learning model. The concept of a feature is related to that of an explanatory variable used in statistical techniques such as linear regression. Choosing informative, discriminating, and independent features are important for the effective operation of the MLP in pattern recognition, classification, and regression. Features may be of different types, such as numeric features, strings, and graphs. In some aspects, training data can be of different types, with the features being numeric for use by a computing device.

In example embodiments, the features used during the DL model training 108 can include one or more of the following: LR images (e.g., the training input data 104, such as LR input images); HR images (e.g., the training desired output data 118, such as HR target output images); sensor data from a plurality of sensors (e.g., audio, motion, image sensors); actuator event data from a plurality of actuators (e.g., wireless switches or other actuators); external information source from a plurality of external sources; timer data associated with the sensor state data (e.g., time sensor data is obtained), the actuator event data, or the external information source data; user communications information; user data; user behavior data, and so forth.

In example embodiments, the training input data 104 and the training desired output data 118 are generated as discussed in connection with, e.g., FIG. 5 and FIG. 6, and are used during the DL model training 108 (e.g., for generating the trained NN model 110 which can be the same as the NN model 306). In this regard, the trained NN model 110 (or the NN model 306) can be configured to perform the UR-related functionalities discussed herein. More specifically, the LR input images of the training input data 104 and the HR target output images of the training desired output data 118 are used to train convolutional layers of the NN model 109 resulting in the generation of the trained NN model 110 (or the NN model 306) to perform real-time UR functions on LR images including LR video frames as discussed herein.

In an example aspect, the DLA 106 can be deployed at a mobile device (e.g., computing device 107) and the new data 114 can include LR images (e.g., frames from an LR video such as a real-time LR video feed). The DLA 106 performs UR functions (e.g., increasing image resolution while reducing noise, removing blocking artifacts, and boosting image contrast) on the LR images to generate HR output images in real-time.

FIG. 2 is a diagram 200 illustrating the generation of a trained NN model 206 using the NN model 109 within the DLA 106 associated with the system of FIG. 1, according to example embodiments. Referring to FIG. 2, source data 202 is analyzed by the convolutional layers 204 of the NN model 109 (or another type of a machine learning algorithm or technique) to generate the trained NN model 206 (which can be the same as the trained NN model 110). The source data 202 can include a training set of data, such as training data 102, including data identified by one or more features.

In example embodiments, the NN model 206 is trained by a neural network model 109 (e.g., deep learning, deep convolutional, or recurrent neural network), which comprises a series of "neurons," such as Long Short Term Memory (LSTM) nodes, arranged into a network. A neuron is an architectural element used in data processing and artificial intelligence, particularly machine learning, that includes a memory that may determine when to "remember" and when to "forget" values held in that memory based on the weights of inputs provided to the given neuron. Each of the neurons used herein is configured to accept a predefined number of inputs from other neurons in the network to provide relational and sub-relational outputs for the content of the frames being analyzed. Individual neurons may be chained together or organized into tree structures in various configurations of neural networks to provide interactions and relationship learning modeling for how each of the frames in an utterance is related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted throughout a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Even though the training architecture 106 is referred to as a deep learning architecture using a neural network model 109 (and the model that is generated as a result of the training is referred to as a trained deep learning model, such as the trained NN models 110 and 206), the disclosure is not limited in this regard and other types of machine learning training architectures may also be used for model training, using the techniques disclosed herein.

Figure 3:
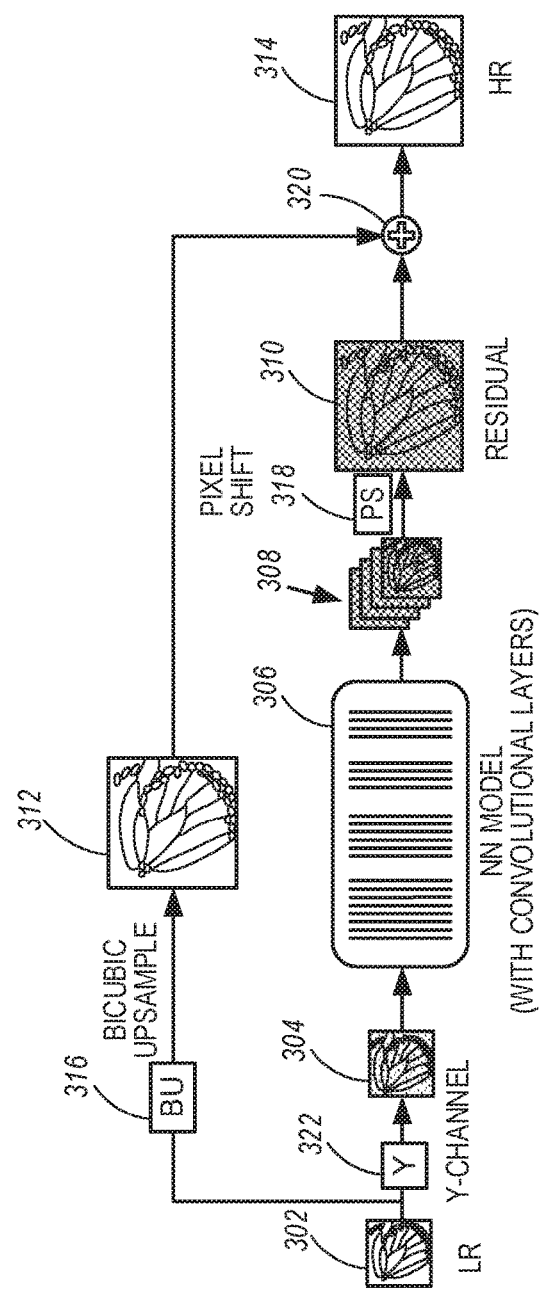
FIG. 3 is a diagram illustrating a system for adjusting image resolution using the DLA of FIG. 1, according to example embodiments.

FIG. 3 is a diagram illustrating a system 300 for adjusting image resolution using the DLA of FIG. 1, according to example embodiments. Referring to FIG. 3, the system 300 includes NN model 306 (with multiple convolutional layers), a residue generation module 322, a bicubic upsampling module 316, a pixel shifting module 318, and an adder 320. The NN model 306 can be similar to the trained NN models 110 (in FIG. 1) and 206 (in FIG. 2).

The residue generation module 322 may comprise suitable circuitry, logic, interfaces, or code and is configured to convert the input LR image 302 from red-green-blue (RGB) color space to a Luma (Y), Chroma Blue Difference (Cb), and Chroma Red Difference (Cr) (or YCbCr) color space and obtain the Y-channel (brightness) LR residual image 304 (i.e., a grayscale image indicative of brightness) that corresponds to the input LR image 302.

The bicubic upsampling module 316 may comprise suitable circuitry, logic, interfaces, or code and is configured to perform bicubic upsampling on the input LR image 302 to generate a base HR image 312.

The NN model 306 is configured to generate a plurality of HR residual sub-images 308 corresponding to an input LR image 302 based on an LR residual image (e.g., a grayscale version of the LR input image such as LR residual image 304). Further details of the convolutional layers of the NN model 306 are discussed hereinbelow in connection with FIG. 4.

Pixel shifting module 318 may comprise suitable circuitry, logic, interfaces, or code and is configured to perform pixel shifting on the plurality of HR residual sub-images 308 to generate an HR residual image 310.

In operation, a low-resolution (LR) input image 302 is processed (e.g., by the bicubic upsampling module 316 and the residue generation module 322) to generate a base HR image 312 and an LR residual image 304 corresponding to the input LR image 302. The NN model 306 uses multiple convolutional layers to involve the LR residual image 304 and generate a plurality of HR residual sub-images 308 corresponding to the input LR image 302. In some aspects, the plurality of HR residual sub-images 308 includes four sub-images. The pixel shifting module 318 performs pixel shifting on the plurality of HR residual sub-images 308 to generate an HR residual image 310. The adder 320 may comprise suitable circuitry, logic, interfaces, or code and is configured to add the base HR image 312 with the HR residual image 310 to generate an HR image 314 as an output image corresponding to the input LR image 302.

By splitting the generation of the HR image 314 into generating the base HR image 312 and the HR residual image 310, the amount of data that flows through the convolutional layers of the NN model 306 is reduced, which increases the effective capacity of the model and its inference efficiency for reconstructing an HR image from an input LR image.

In some aspects, one or more functionalities performed by the bicubic upsampling module 316, the residue generation module 322, the pixel shifting module 318, and the adder 320 can be performed by the NN model 306.

Figure 4:
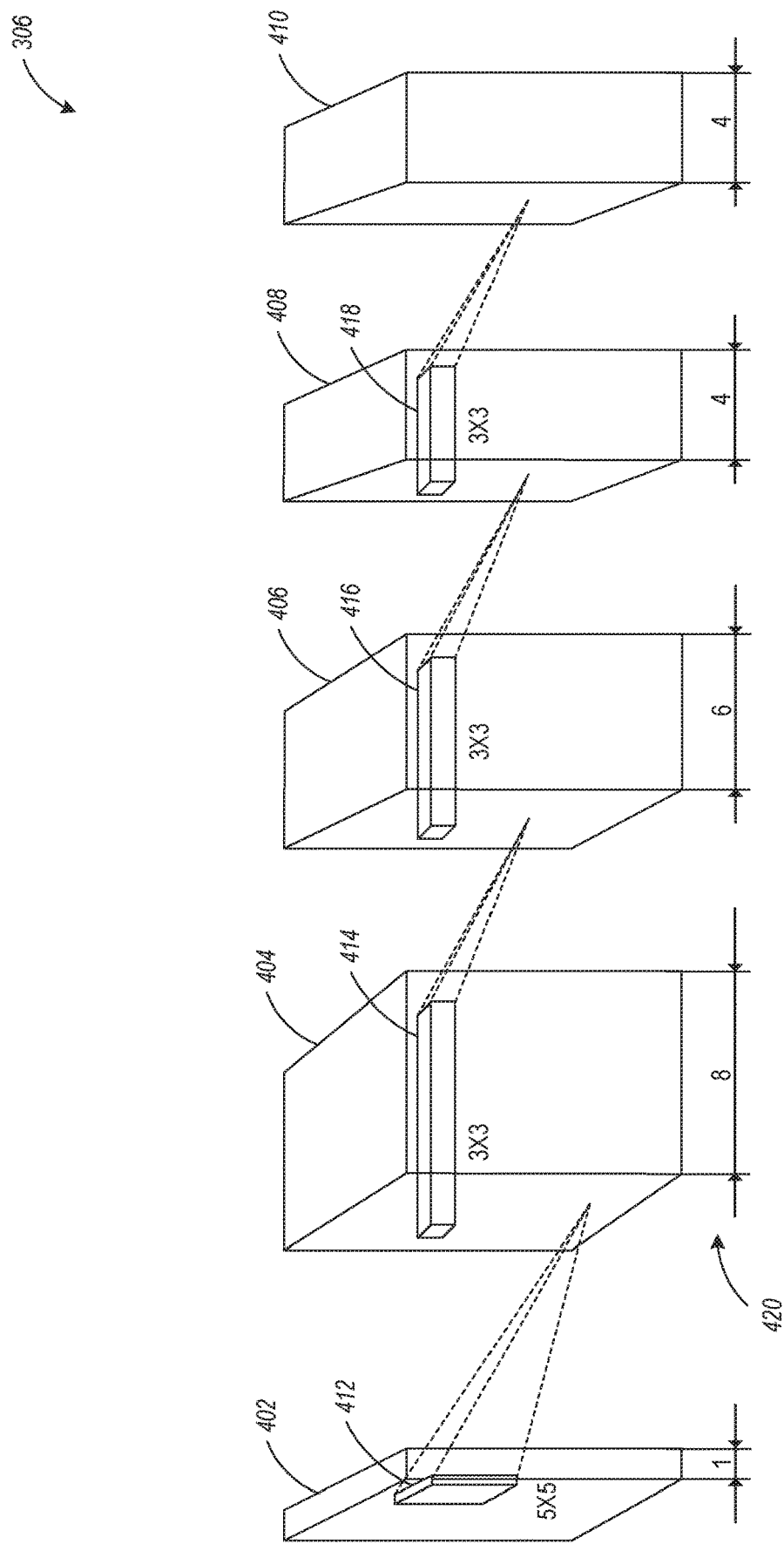
FIG. 4 is a diagram illustrating the configuration of convolutional layers within the DLA as used by the system of FIG. 3, according to example embodiments.

FIG. 4 is a diagram illustrating the configuration of convolutional layers of the NN model 306 within the DLA as used by the system 300 of FIG. 3, according to example embodiments. Referring to FIG. 4, the NN model 306 includes four convolutional layers in the example shown, namely, convolutional layers 404, 406, 408, and 410, with layer depth (or several channels) 420 as indicated in FIG. 4. It should be understood that the convolutional layers of the NN model 306 may use other numbers of layers. The first convolutional layer 404 is configured to generate 8 channels of measurements (i.e., the layer has a depth of 8), the second convolutional layer 406 is configured to generate 6 channels of measurements (i.e., the layer has a depth of 6), and the third and fourth convolutional layers (408 and 410 respectively) are each configured to generate 4 channels of measurements (i.e., the layers have a depth of 4). Convolutional layers 404-408 are configured to generate their channel measurements using convolution kernels 414, 416, and 418, respectively, of size 3×3 pixels.

The NN model 306 can also include a one-channel input layer 402, which corresponds to the image received as input to convolutional layers 404-410. For example, the input layer 402 can be representative of the LR residual image 304 communicated as input to the convolutional layers 404-410. The input layer 402 can include a kernel 412 (e.g., a 5×5 pixel kernel), which is used for communicating image data as input into the first convolutional layer 404.

In operation, each of the convolutional layers 404-410 convolves the input received from a previous layer using multiple convolution kernels. For example, after the first convolutional layer 404 receives input data from the input layer 402 via the kernel 412, the first convolutional layer 404 generates eight channels of measurements using the input from input layer 402 and eight different convolution kernels of size 3×3 pixels (such as convolutional kernel 414). The measurements of each channel are communicated to the subsequent layer for additional convolutions. The fourth convolutional layer 410 outputs the plurality of HR residual sub-images 308 (e.g., each of the four channels of layer 410 outputs one HR residual sub-image for a total of four HR residual sub-images 308).

Even though FIG. 4 illustrates the NN model 306 including four separate convolutional layers 404-410 with the indicated layer depth 420, the disclosure is not limited in this regard and a different configuration of the convolutional layers of the NN model 306 can also be used within the system 300 for performing UR-related functions.

FIG. 5 is a diagram 500 illustrating the generation of training image sets, which can be used during the DL model training 108 to generate the trained NN model 110 within the DLA 106 of FIG. 1, according to example embodiments. Referring to FIG. 5, each training image set includes an LR image 510 used as a convolution layers input image 532 (e.g., corresponding to the training input data 104), and a plurality of HR residual sub-images 518 used as a set of convolution layers target output images 536 (e.g., corresponding to the training desired output data 118). Both the convolutional layers input image 532 and the convolution layers target output images 536 are inputted into the NN model 306 during the training phase, and the convolution layers target output images 536 do not comprise an actual output during the training phase. It should be understood that during actual convolving operation, images to be processed are inputted into the NN model 306 and the NN model 306 will output a processed UR image(s).

To generate the convolutional layers input image 532, a low-pass filter (LPF) 522 is applied on an example training image (also referred for brevity as I) 502 to generate a filtered image 504. The filtered image 504 is then downsampled (e.g., using downsampling (DS) module 524) to generate a downsampled LR image $I_{LR}$ 506. In some aspects, the filtered image 504 can be downsampled by a factor of 0.5, represented by the following equation: $I_{LR}=I*N(0, \sigma_{blur})\downarrow_{0.5}$, where * denotes a convolution operation and $N(0, \sigma_{blur})$ denotes a Gaussian function with mean 0 and standard deviation of $\sigma_{blur}$.

In some aspects, the LPF 522 is used to remove the high-frequency signal and thereby avoid under-sample artifacts. In some aspects, downsampling by the DS module 524 is done by bicubic interpolation. The image quality of the downsampled (e.g., half-sized) LR image 506 is then degraded by noise and blocking artifacts before it is fed it into the convolutional layers. More specifically, the noise addition module 526 is used to introduce noise into the downsampled LR image 506. In some aspects, two kinds of noise are simulated, which are (1) photon noise and (2) Gaussian noise.

The photon noise is used to simulate the discrete characteristic of light and is simulated with a Poisson stochastic process, as follows: $I_{phos} \sim P(I_{LR} \cdot photons)/photons$, where $P(\lambda)$ denotes Poisson distribution with mean $\lambda$, and photons denotes the number of photons that produce the brightest color that the image can represent.

The Gaussian noise is used to simulate the stochastic noise from image sensors. It is calculated by adding a random image $I_{gauss}$ generated with a Gaussian stochastic process to the input image, as follows: $I_{noisy}=I_{pho}+I_{gauss}$, with $I_{gauss} \sim N(0, \sigma_n)$, where $\sigma_n$ stands for the targeted noise level.

Video compression and decompression usually cause blocking artifacts in the video frames. In this regard, in aspects when blocking artifacts need to be added to images (e.g., by the artifacts addition module 528), such artifacts can be added when video compression and decompression is performed. Training a neural network model (e.g., 206) using convolutional layers with degraded image quality on the input side will offer the neural network model noise reduction and artifact removal ability.

The noise addition module 526 introduces noise into the downsampled LR image 506 to generate a noisy LR image 508. The noisy LR image 508 is further degraded by the artifacts addition module 528, which introduces artifacts and generates an LR image 510 corresponding to the training image I 502. The LR image 510 is characterized by degraded image quality and is configured as a convolutional layers input image 532 into the NN model 306, for the training phase. The convolutional layers input image 532 will be used to train the NN model 306 to generate the desired target output. Here, the desired output of the NN model 306 is inputted as the convolutional layers target output images 536 during the training phase of the convolutional layers.

To generate the set of convolutional layers target output images 536 for the convolutional network, the training image I 502 is enhanced by the local contrast enhancement (LCE) module 520 that generates a contrast-enhanced image 512. This processing contributes to teaching the NN model 306 to produce images with high local contrast, which boosts the fine details recovered by super-resolution. In some aspects, the LCE module 520 can perform the local contrast enhancement by applying an unbalanced unsharp mask, as follows: $I_{lc}=I+\min(I-I*N(0, \sigma_{um}), \delta_{max})$, where the difference between the training image and a Gaussian blurred version of it is truncated in the positive part with an upper bound $\delta_{max}$ (the truncation is beneficial in reducing halo artifacts that appear due to human eyes being sensitive to bright edges). The HR residual image 516 is then calculated by subtracting the upsampled LR image 538 of the downsampled LR image 506 from the contrast-enhanced image 512 via the subtraction module 540. The upsampled LR image 538 is generated by upsampling the downsampled LR image 506 by the upsampling module 530. A pixel splitting operation 534 is applied to the HR residual image 516 so that a plurality of HR residual sub-images 518 are generated from the HR residual image 516 (e.g., by splitting 4×4 pixel blocks into the four sub-images). The plurality of HR residual sub-images 518 is configured as the convolutional layers target output images 536, to be inputted into the NN model 306 during the training phase.

In some aspects, multiple training image sets are generated before training the NN model 306, and the training image sets are saved in a data file (e.g., using a tfrecord format). During neural network model training (e.g., 108), the training code can extract the training data and use such data to adjust the model parameters (e.g., weights used by convolutional layers of the NN model 306) for performing UR processing. This speeds up the model training by avoiding complicated image processing on the fly and allows the model to be trained repeatedly with different parameters associated with the training data.

By using the neural network model training techniques discussed herein (e.g., degrading the image quality on the input side and enhancing the image quality on the output side), the NN model 306 can generate images or video frames of superior visual perception during UR processing of LR images or video frames. Additionally, the use of a concise neural network model (e.g., convolutional layers with a limited number of layers, such as four, within the NN model 306) that combines the functions of super-resolution, noise reduction, removal of blocking artifacts, and local contrast enhancement, the concise neural network model can be deployed on mobile devices (or other types of limited-resource devices, such as smart TVs, tablets, laptops, and other computing devices) for performing real-time UR processing.

Figure 6:
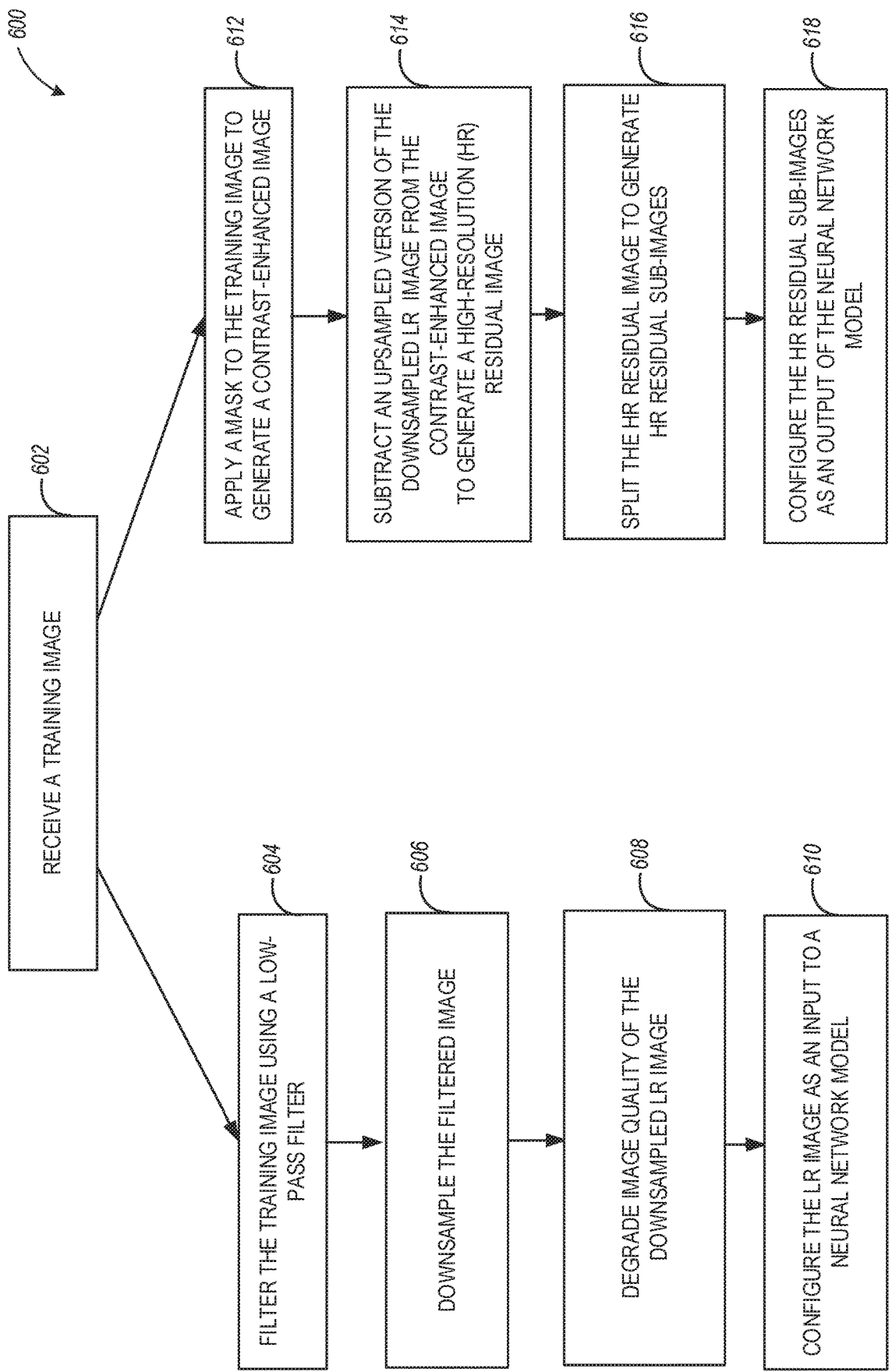
FIG. 6 is a flowchart of the generation of training image sets and using the sets for DLA training and performing image resolution adjustment functionalities, according to example embodiments.

FIG. 6 is a flowchart of a method 600 of a generation of training image sets, and using the sets for DLA training and performing image resolution adjustment functionalities, according to example embodiments. The method 600 includes operations 602-618. By way of example and not limitation, the method 600 is described as being performed by the ultra-resolution management module 860, which can be configured to execute within a mobile device such as device 900 illustrated in FIG. 9.

Referring to FIG. 6, the generation of a training image set can start at operation 602 when a training image (e.g., training image 1502) is received. At operation 604, the training image is filtered using a low-pass filter (e.g., 522) to generate a filtered image (e.g., 504). At operation 606, the filtered image is downsampled (e.g., by the downsampling module 524) to generate a downsampled LR image (e.g., 506). At operation 608, the image quality of the downsampled LR image is degraded by adding noise (e.g., by the noise addition module 526) and artifacts (e.g., by the artifacts addition module 528) to generate a low-resolution image corresponding to the training image and having degraded image quality (e.g., LR image 510). At operation 610, the LR image corresponding to the training image is configured as an input to the neural network model.

To generate the output image within the training image set, at operation 612, an unbalanced unsharp mask is applied to the training image to generate a contrast-enhanced image (e.g., LCE module 520 generates the contrast-enhanced image 512). At operation 614, an upsampled version of the downsampled LR image is subtracted from the contrast-enhanced image to generate an HR residual image corresponding to the training image (e.g., HR residual image 516 is generated by the subtraction module 540 using the upsampled LR image 538 and the contrast-enhanced image 512). At operation 616, the HR residual image (corresponding to the training image) is split to generate a plurality of HR residual sub-images corresponding to the training image (e.g., a plurality of HR residual sub-images 518 are generated via a pixel splitting operation 534 performed on the HR residual image 516). At operation 618, the plurality of HR residual sub-images corresponding to the training image is configured as an output of the neural network model (e.g., the plurality of HR residual sub-images 518 is configured as a set of convolutional layer target output images 536 for training the NN model 306).

Figure 7:
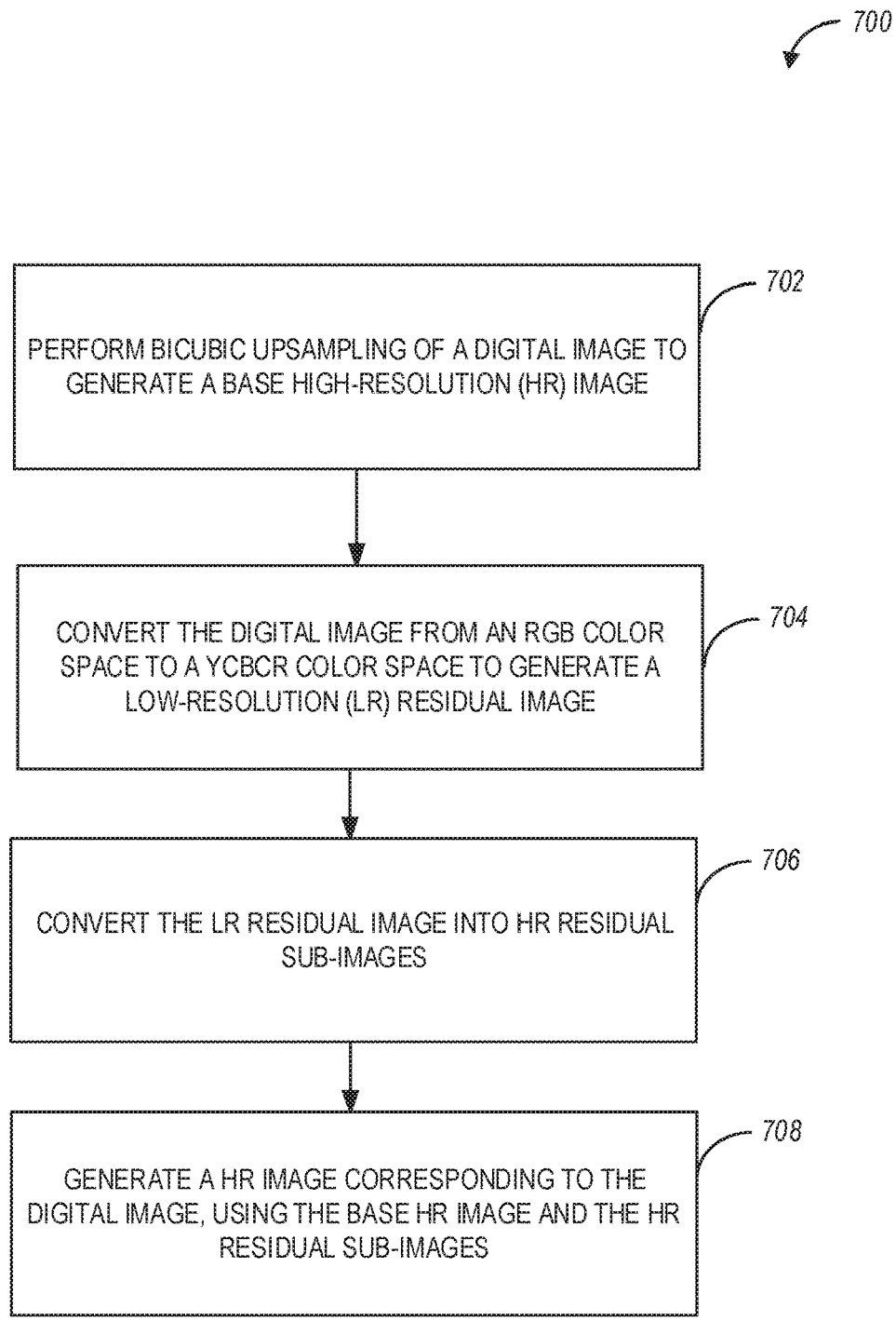
FIG. 7 is a flowchart of a method for increasing image resolution of a digital image, according to example embodiments.

FIG. 7 is a flowchart of a method 700 for increasing image resolution of a digital image, according to example embodiments. The method 700 includes operations 702, 704, 706, and 708. By way of example and not limitation, the method 700 is described as being performed by the ultra-resolution management module 860, which can be configured to execute within a mobile device such as device 900 illustrated in FIG. 9.

Referring to FIG. 7, at operation 702, bicubic upsampling is performed on a digital image to generate a base high-resolution (HR) image. For example, and about FIG. 3, a bicubic upsampling module generates the base HR image using the input LR image. At operation 704, the digital image is converted from a red-green-blue (RGB) color space to a Luma (Y), Chroma Blue Difference (Cb), and Chroma Red Difference (Cr) (YCbCr) color space to generate a low-resolution (LR) residual image. In some aspects, the RGB-to-YCrCb conversion can be performed by applying a plurality of convolutional layers of a neural network to the digital image (or by using a residue generation module) to generate the LR residual image.

At operation 706, the LR residual image is converted (e.g., by using the plurality of convolutional layers) into a plurality of HR residual sub-images corresponding to the input LR image. For example, the convolutional layers use the LR residual image to generate a plurality of HR residual sub-images corresponding to the input LR image. At operation 708, an HR image corresponding to the input LR image is generated using the base HR image and the plurality of HR residual sub-images. For example, the HR residual image is generated by pixel-shifting the plurality of HR residual sub-images. The HR image is generated using the base HR image and the HR residual image.

Figure 8:
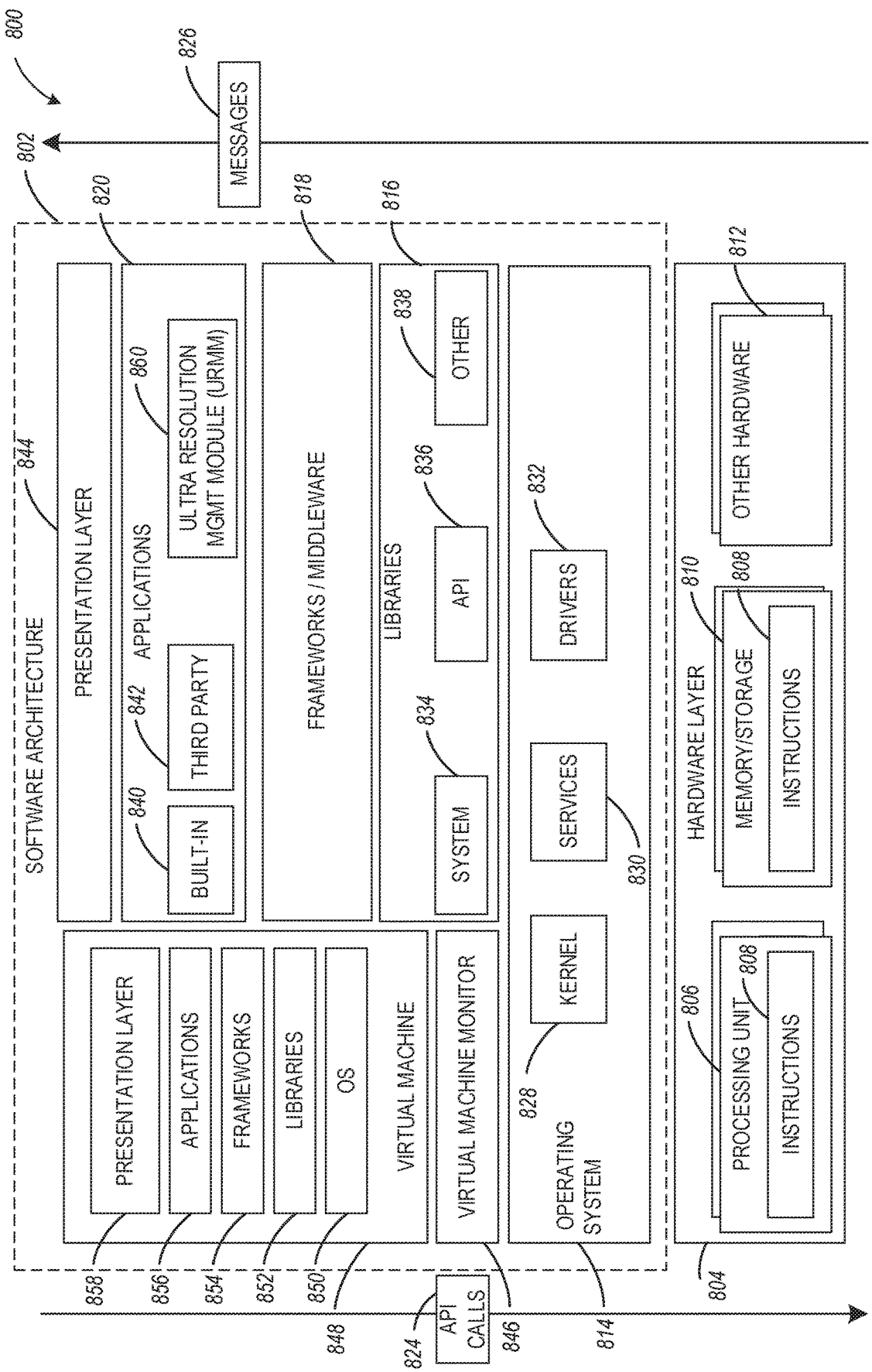
FIG. 8 is a block diagram illustrating a representative software architecture, which may be used in conjunction with various device hardware described herein, according to example embodiments.

FIG. 8 is a block diagram illustrating a representative software architecture 800, which may be used in conjunction with various device hardware described herein, according to example embodiments. FIG. 8 is merely a non-limiting example of a software architecture 802 and it will be appreciated that many other architectures may be implemented to facilitate the functionality described herein. The software architecture 802 executes on hardware, such as computing device 107 in FIG. 1 which can be the same as device 900 of FIG. 9 that includes, among other things, processor 905, memory 910, storage 915 and/or 920, and I/O interfaces 925 and 930.

Figure 9:
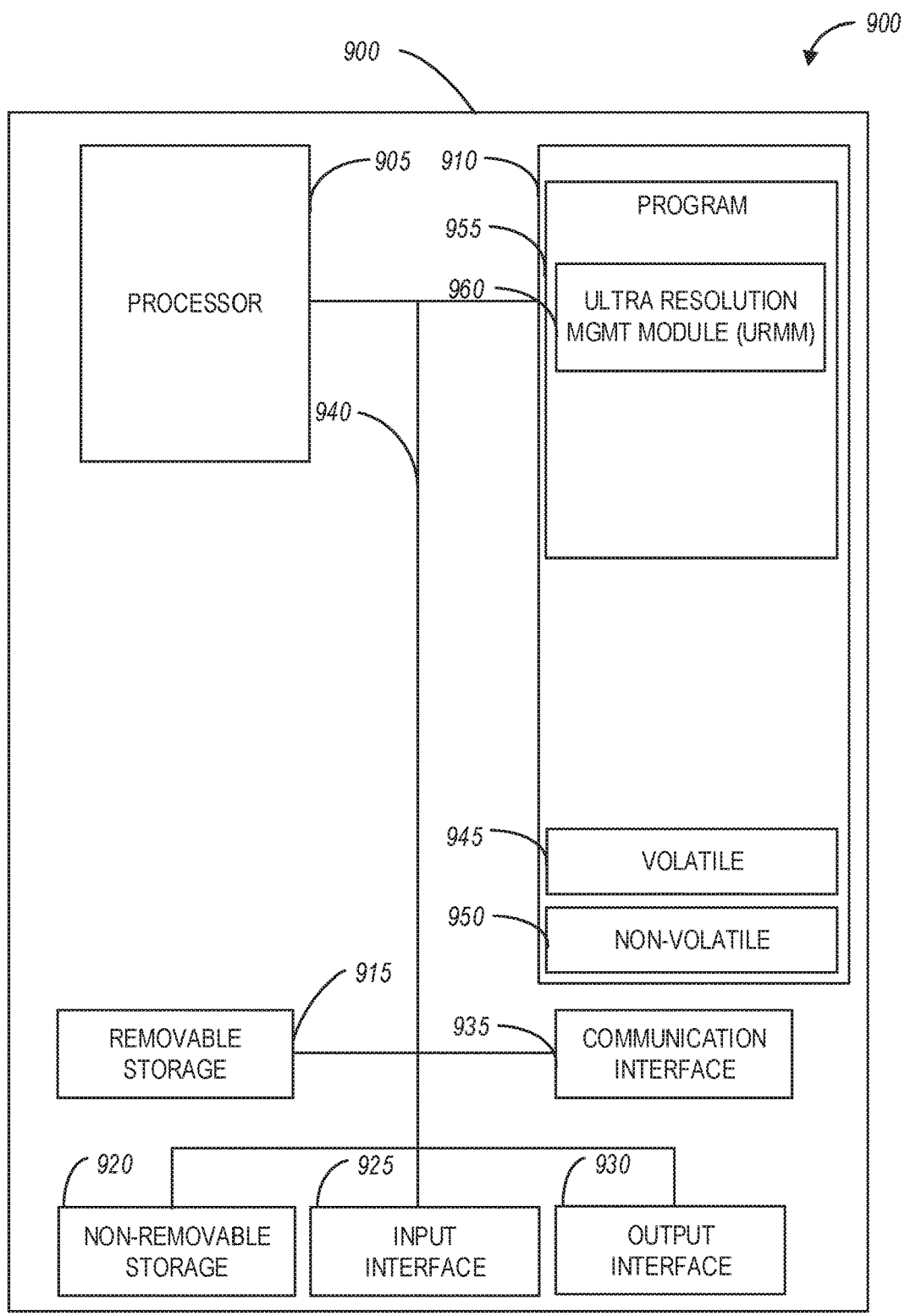
FIG. 9 is a block diagram illustrating circuitry for a device that implements algorithms and performs methods, according to example embodiments.

A representative hardware layer 804 is illustrated and can represent, for example, the device 900 of FIG. 9. The representative hardware layer 804 comprises one or more processing units 806 having associated executable instructions 808. Executable instructions 808 represent the executable instructions of the software architecture 802, including implementation of the methods, modules, and so forth of FIGS. 1-7. Hardware layer 804 also includes memory or storage modules 810, which also have executable instructions 808. Hardware layer 804 may also comprise other hardware 812, which represents any other hardware of the hardware layer 804, such as the other hardware illustrated as part of device 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 or other components within the layers may invoke application programming interface (API) calls 824 through the software stack and receive a response, returned values, and so forth illustrated as messages 826 in response to the API calls 824. The layers illustrated in FIG. 8 are representative in nature and not all software architectures 802 have all layers. For example, some mobile or special purpose operating systems may not provide frameworks/middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 816 may provide a common infrastructure that may be utilized by the applications 820 or other components or layers. The libraries 816 typically provide functionality that allows other software modules to perform tasks more easily than to interface directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 (also sometimes referred to as middleware) may provide a higher-level common infrastructure that may be utilized by the applications 820 or other software components/modules. For example, the frameworks/middleware 818 may provide various graphical user interface (GUI) functions, high-level resource management, high-level location services, and so forth. The frameworks/middleware 818 may provide a broad spectrum of other APIs that may be utilized by the applications 820 or other software components/modules, some of which may be specific to a particular operating system 814 or platform.

The applications 820 include built-in applications 840, third-party applications 842, and an ultra-resolution management module (URMM) 860. In some aspects, the URMM 860 may comprise suitable circuitry, logic, interfaces, or code and can be configured to perform one or more of the UR-related functions discussed in connection with FIGS. 1-7.

Examples of representative built-in applications 840 may include but are not limited to, a contacts application, a browser application, a book reader application, a location application, a media application, a messaging application, or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830, and drivers 832), libraries (e.g., system libraries 834, API libraries 836, and other libraries 838), and frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware machine (such as the device 900 of FIG. 9, for example). A virtual machine 848 is hosted by a host operating system (e.g., operating system 814) and typically, although not always, has a virtual machine monitor 846, which manages the operation of the virtual machine 848 as well as the interface with the host operating system (i.e., operating system 814). A software architecture 802 executes within the virtual machine 848 such as an operating system 850, libraries 852, frameworks/middleware 854, applications 856, or presentation layer 858. These layers of software architecture executing within the virtual machine 848 can be the same as corresponding layers previously described or may be different.

FIG. 9 is a block diagram illustrating circuitry for a device that implements algorithms and performs methods, according to example embodiments. All components need not be used in various embodiments. For example, clients, servers, and cloud-based network devices may each use a different set of components, or in the case of servers, larger storage devices.

One example computing device in the form of a computer 900 (also referred to as computing device 900, computer system 900, or computer 900) may include a processor 905, memory 910, removable storage 915, non-removable storage 920, input interface 925, output interface 930, and communication interface 935, all connected by a bus 940. Although the example computing device is illustrated and described as the computer 900, the computing device may be in different forms in different embodiments.

The memory 910 may include volatile memory 945 and non-volatile memory 950 and may store a program 955. The computing device 900 may include—or have access to a computing environment that includes—a variety of computer-readable media, such as the volatile memory 945, the non-volatile memory 950, the removable storage 915, and the non-removable storage 920. Computer storage includes random-access memory (RAM), read-only memory (ROM), erasable programmable read-only memory (EPROM), electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 955 stored in the memory 910) are executable by the processor 905 of the computing device 900. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

The program 955 may utilize a customer preference structure using modules discussed herein, such as the URMM 960, which may be the same as or similar to the URMM 860 of FIG. 8.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, the URMM 960 as well as one or more other modules that are part of the program 955, can be integrated as a single module, performing the corresponding functions of the integrated modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above regarding any one or all of the steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein is for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled," and variations thereof, are not restricted to physical or mechanical connections or couplings. Further, terms such as up, down, bottom, and top are relative, and are employed to aid illustration, but are not limiting.

The components of the illustrative devices, systems, and methods employed by the illustrated embodiments can be implemented, at least in part, in digital electronic circuitry, analog electronic circuitry, or computer hardware, firmware, software, or in combinations of them. These components can be implemented, for example, as a computer program product such as a computer program, program code or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other units suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data or generating an output). Method steps can also be performed by, and apparatus for performing the methods can be implemented as, special purpose logic circuitry, e.g., an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, or data storage disks (e.g., magnetic disks, internal hard disks, or removable disks, magneto-optical disks, or CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") comprises a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium or a combination of multiple media, that is capable of storing instructions for execution by one or more processors, such that the instructions, when executed by one or more processors, cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Although the present disclosure has been described concerning specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations or equivalents that fall within the scope of the present disclosure. Other aspects may be within the scope of the following claims. Finally, as used herein, the conjunction "or" refers to a non-exclusive "or," unless specifically stated otherwise.

What is claimed is:

1. A computer-implemented method for increasing image resolution of a digital image, the method comprising:
   performing bicubic upsampling of the digital image to generate a base high-resolution (HR) image;
   converting the digital image from a red-green-blue (RGB) color space to a Luma (Y), Chroma Blue Difference (Cb), and Chroma Red Difference (Cr) (YCbCr) color space to generate a low-resolution (LR) residual image, the LR image being a grayscale image indicative of brightness of the digital image;
   converting, using a plurality of convolutional layers of a neural network model, the LR residual image into a plurality of HR residual sub-images corresponding to the digital image, the LR residual image associated with a first resolution, the plurality of HR residual sub-images associated with a second resolution, and the second resolution being higher than the first resolution; and
   generating an HR image corresponding to the digital image, using the base HR image and the plurality of HR residual sub-images.

2. The computer-implemented method of claim 1, further comprising:
   pixel shifting the plurality of HR residual sub-images to generate an HR residual image; and
   wherein the generating of the HR image corresponding to the digital image comprises combining the HR residual image and the base HR image.

3. The computer-implemented method of claim 1, wherein the neural network model comprises a single input layer, and the plurality of convolutional layers comprises four convolutional layers that are separate from the single input layer.

4. The computer-implemented method of claim 3, wherein the single input layer is configured to receive the LR residual image corresponding to the digital image, and an output layer of the four convolutional layers is configured to output the plurality of HR residual sub-images.

5. The computer-implemented method of claim 3, wherein:
a first layer of the plurality of convolutional layers is configured with 3×3 pixel kernels and 8 channels;
a second layer of the plurality of convolutional layers is configured with 3×3 pixel kernels and 6 channels;
a third layer of the plurality of convolutional layers is configured with 3×3 pixel kernels and 4 channels; and
a fourth layer of the plurality of convolutional layers is configured with 4 channels.

6. The computer-implemented method of claim 1, further comprising:
training the neural network model with a plurality of training image sets derived from a training image, each training image set of the plurality of training image sets comprising:
a training LR image corresponding to the training image, the training LR image having a degraded image quality and configured as an input to the neural network model; and
a plurality of training HR residual sub-images corresponding to the training image and configured as a target output of the neural network model.

7. The computer-implemented method of claim 6, wherein training the neural network model further comprises:
filtering the training image using a low-pass filter to generate a filtered image;
downsampling the filtered image to generate a downsampled LR image; and
degrading image quality of the downsampled LR image by adding noise and artifacts, to generate the training LR image corresponding to the training image.

8. The computer-implemented method of claim 7, wherein training the neural network model further comprises:
applying an unbalanced unsharp mask to the training image to generate a contrast-enhanced image; and
subtracting an upsampled version of the downsampled LR image from the contrast-enhanced image to generate an HR residual image corresponding to the training image.

9. The computer-implemented method of claim 8, wherein training the neural network model further comprises:
splitting the HR residual image corresponding to the training image to generate the plurality of HR residual sub-images corresponding to the training image.

10. A system comprising:
a memory storing instructions; and
one or more processors in communication with the memory, wherein the one or more processors execute the instructions to:
perform bicubic upsampling of a digital image to generate a base high-resolution (HR) image;
convert the digital image from a red-green-blue (RGB) color space to a Luma (Y), Chroma Blue Difference (Cb), and Chroma Red Difference (Cr) (YCbCr) color space to generate a low-resolution (LR) residual image, the LR image being a grayscale image indicative of brightness of the digital image;
convert, using a plurality of convolutional layers of a neural network model, the LR residual image into a plurality of HR residual sub-images corresponding to the digital image, the LR residual image associated with a first resolution, the plurality of HR residual sub-images associated with a second resolution, and the second resolution being higher than the first resolution; and
generate an HR image corresponding to the digital image, using the base HR image and the plurality of HR residual sub-images.

11. The system of claim 10, wherein the one or more processors execute the instructions to:
shift pixels of the plurality of HR residual sub-images to generate an HR residual image; and
combine the HR residual image and the base HR image to generate the HR image corresponding to the digital image.

12. The system of claim 10, wherein:
the neural network model comprises a single input layer, and the plurality of convolutional layers comprises four convolutional layers;
the single input layer is configured to receive the LR residual image corresponding to the digital image; and
an output layer of the four convolutional layers is configured to output the plurality of HR residual sub-images.

13. The system of claim 12, wherein:
a first layer of the plurality of convolutional layers is configured with 3×3 pixel kernels and 8 channels;
a second layer of the plurality of convolutional layers is configured with 3×3 pixel kernels and 6 channels;
a third layer of the plurality of convolutional layers is configured with 3×3 pixel kernels and 4 channels; and
a fourth layer of the plurality of convolutional layers is configured with 4 channels.

14. The system of claim 10, wherein the one or more processors execute the instructions to:
train the neural network model with a plurality of training image sets, each training image set of the plurality of training image sets comprising:
a training LR image corresponding to a training image, the training LR image having a degraded image quality and configured as an input to the neural network model; and
a plurality of training HR residual sub-images corresponding to the training image and configured as a target output of the neural network model.

15. The system of claim 14, wherein to train the neural network model, the one or more processors execute the instructions to:
filter the training image using a low-pass filter to generate a filtered image;
downsample the filtered image to generate a downsampled LR image; and
degrade image quality of the downsampled LR image by adding noise and artifacts, to generate the training LR image corresponding to the training image.

16. The system of claim 15, wherein to train the neural network model, the one or more processors execute the instructions to:
apply an unbalanced unsharp mask to the training image to generate a contrast-enhanced image; and
subtract an upsampled version of the downsampled LR image from the contrast-enhanced image to generate an HR residual image corresponding to the training image.

17. The system of claim 16, wherein to train the neural network model, the one or more processors execute the instructions to:

split the HR residual image corresponding to the training image to generate the plurality of HR residual sub-images corresponding to the training image.

18. A non-transitory computer-readable medium storing computer instructions for increasing image resolution of a digital image, wherein the instructions when executed by one or more processors, cause the one or more processors to perform steps comprising:
    performing bicubic upsampling of the digital image to generate a base high-resolution (HR) image;
    converting the digital image from a red-green-blue (RGB) color space to a Luma (Y), Chroma Blue Difference (Cb), and Chroma Red Difference (Cr) (YCbCr) color space to generate a low-resolution (LR) residual image, the LR image being a grayscale image indicative of brightness of the digital image;
    converting, using a plurality of convolutional layers of a neural network model, the LR residual image into a plurality of HR residual sub-images corresponding to the digital image, the LR residual image associated with a first resolution, the plurality of HR residual sub-images associated with a second resolution, and the second resolution being higher than the first resolution; and
    generating an HR image corresponding to the digital image, using the base HR image and the plurality of HR residual sub-images.

19. The non-transitory computer-readable medium of claim 18, wherein the instructions further cause the one or more processors to perform steps comprising:
    training the neural network model with a plurality of training image sets, each training image set of the plurality of training image sets comprising:
        a training LR image corresponding to a training image, the training LR image having a degraded image quality and configured as an input to the neural network model; and
        a plurality of training HR residual sub-images corresponding to the training image and configured as a target output of the neural network model.

20. The non-transitory computer-readable medium of claim 19, wherein the instructions further cause the one or more processors to perform steps comprising:
    filtering the training image using a low-pass filter to generate a filtered image;
    downsampling the filtered image to generate a downsampled LR image;
    degrading image quality of the downsampled LR image by adding noise and artifacts, to generate the training LR image corresponding to the training image;
    applying an unbalanced unsharp mask to the training image to generate a contrast-enhanced image;
    subtracting an upsampled version of the downsampled LR image from the contrast-enhanced image to generate an HR residual image corresponding to the training image; and
    splitting the HR residual image corresponding to the training image to generate the plurality of HR residual sub-images corresponding to the training image.

* * * * *